(12) United States Patent
Stengel et al.

(10) Patent No.: US 10,934,915 B2
(45) Date of Patent: Mar. 2, 2021

(54) INTERNAL COMBUSTION ENGINE

(71) Applicant: DEUTZ AKTIENGESELLSCHAFT, Cologne (DE)

(72) Inventors: Ralph Stengel, Cologne (DE); Dominic Weber, Pulheim (DE); Peter Broll, Bergisch-Gladbach (DE); Daniel Dammer, Cologne (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 16/326,414

(22) PCT Filed: Aug. 7, 2017

(86) PCT No.: PCT/EP2017/000958
§ 371 (c)(1),
(2) Date: Feb. 19, 2019

(87) PCT Pub. No.: WO2018/036647
PCT Pub. Date: Mar. 1, 2018

(65) Prior Publication Data
US 2019/0186320 A1 Jun. 20, 2019

(30) Foreign Application Priority Data
Aug. 24, 2016 (DE) .......................... 102016010100.8

(51) Int. Cl.
*F01N 13/08* (2010.01)
*F01N 3/20* (2006.01)
*B01D 19/00* (2006.01)
*B01D 29/90* (2006.01)
(Continued)

(52) U.S. Cl.
CPC ....... *F01N 3/2066* (2013.01); *B01D 19/0031* (2013.01); *B01D 29/904* (2013.01);
(Continued)

(58) Field of Classification Search
CPC .... F01N 3/208; F01N 3/2066; F01N 2610/02; F01N 2610/14; F01N 2610/1406;
(Continued)

(56) References Cited

U.S. PATENT DOCUMENTS 5,832,717 A 11/1998 Halin
9,752,486 B2 9/2017 Yang et al.
(Continued)

FOREIGN PATENT DOCUMENTS

DE 102007012918 A1 9/2008
DE 102009000097 7/2010
(Continued)

OTHER PUBLICATIONS

ISR of PCT/EP2017/000958, dated Feb. 16, 2018.

*Primary Examiner* — Jonathan R Matthias
(74) *Attorney, Agent, or Firm* — Davidson, Davidson & Kappel, LLC

(57) ABSTRACT

An internal combustion engine including a urea-water solution injection in the exhaust system, includes at least one urea-water solution tank, at least one pump, at least one intake line leading to the pump, at least one urea-water solution metering valve which is connected to the pump with the aid of a pressure line, and at least one return line which leads from the pump to the urea-water solution tank and at whose end opposite to the pump a filter element is situated, as well as at least one urea-water solution sensor situated in the urea-water solution tank.

14 Claims, 3 Drawing Sheets

(51) Int. Cl.
  *B01D 39/14* (2006.01)
  *B01D 39/16* (2006.01)
  *B01D 39/20* (2006.01)
  *B01D 53/94* (2006.01)
(52) U.S. Cl.
  CPC .......... *B01D 39/14* (2013.01); *B01D 39/1615* (2013.01); *B01D 39/2017* (2013.01); *B01D 39/2034* (2013.01); *B01D 53/9431* (2013.01); *B01D 2239/0208* (2013.01); *B01D 2239/0618* (2013.01); *B01D 2239/1216* (2013.01); *F01N 2610/02* (2013.01); *F01N 2610/10* (2013.01); *F01N 2610/14* (2013.01); *F01N 2610/1406* (2013.01); *F01N 2610/148* (2013.01); *F01N 2610/1426* (2013.01); *F01N 2610/1433* (2013.01); *F01N 2610/1453* (2013.01); *F01N 2610/1466* (2013.01); *F01N 2610/1473* (2013.01)
(58) Field of Classification Search
  CPC ..... F01N 2610/1426; F01N 2610/1466; F01N 2610/1473; B01D 19/0031
  See application file for complete search history.

(56) References Cited

U.S. PATENT DOCUMENTS

| | | | |
|---|---|---|---|
| 2002/0081239 A1 | 6/2002 | Ralesch | |
| 2011/0016853 A1* | 1/2011 | Tipton | B01D 53/9409 |
| | | | 60/295 |
| 2014/0166126 A1 | 6/2014 | Turner | |
| 2014/0334983 A1* | 11/2014 | Yang | G01F 23/2961 |
| | | | 422/119 |

FOREIGN PATENT DOCUMENTS

| | | |
|---|---|---|
| DE | 102009029400 | 3/2011 |
| DE | 112014002334 | 1/2016 |
| EP | 2206897 | 7/2010 |
| EP | 2708710 | 3/2014 |
| WO | WO2009118325 | 10/2009 |
| WO | WO 2013029950 A1 | 3/2013 |
| WO | WO2016/076830 | 5/2016 |

* cited by examiner

INTERNAL COMBUSTION ENGINE

The present invention relates to an internal combustion engine including a urea-water solution injection in the exhaust system as well as a method for degasification and filtration.

Degasification refers to removing gases and other volatile substances from liquids and solids in a controlled manner.

BACKGROUND

The elimination of dissolved substances or of substances confined in the form of bubbles, prevents further possible negative effects, such as hydrogen embrittlement of steel, deterioration of materials due to oxidation, hydrolysis due to moisture, corrosion of steam boilers, pipes, etc. due to oxygen and carbon dioxide in the liquid, and failure of hydraulic systems by increased compressibility. The most commonly used method for degasification is to subject the material to be degassed to a vacuum. If ultrasound is introduced into a liquid, for example via a sonotrode, a high-frequency alternating pressure field is formed therein. The short-term negative pressure which is periodically formed results in cavities. This effect is referred to as cavitation. The cavities are formed at gas pockets, for example, which act as cavitation nuclei. The dissolved gas diffuses into the cavitation bubbles and prevents them from completely imploding during the subsequent pressure increase: The bubbles grow with every oscillation process. If standing waves are formed through reflections, the bubbles are pushed to their nodes, where they coalesce and ultimately migrate to the surface as a result of their buoyancy. Due to the temperature dependency of the Henry constant, a degasification may also be achieved solely by raising the temperature. The easiest possibility is to feed energy at decreased pressure and is referred to as boiling in vacuum. This effect may be observed during the normal boiling procedure; air bubbles forming in the water in this case.

Devices of this type are described, for example, in WO 2013029950 A1, where so-called gas traps are used to catch air bubbles or in DE 102007012918 A1, where tiny air bubbles, which are retained in a filter, are generated by high-frequency opening and closing of a liquid valve. The disadvantage here is that, as is the case in WO 2013029950 A1, tiny gas bubbles linger rather randomly at different locations. Or, as is the case in DE 102007012918 A1, tiny bubbles are generated instead of removed.

SUMMARY OF THE INVENTION

It is an object of the present invention to prevent the disadvantages mentioned above and to provide a device and a method which reliably degas and filter a urea-water solution.

The present invention provides an internal combustion engine including a urea-water solution injection in the exhaust system, including at least one urea-water solution tank, at least one pump, at least one intake line leading to the pump, at least one urea-water solution metering valve which is connected to the pump with the aid of a pressure line, and at least one return line which leads from the pump to the urea-water solution tank and at whose end opposite to the pump a filter element is situated, as well as at least one urea-water solution sensor situated in the urea-water solution tank, and a method for degasification and filtration of the urea-water solution, in particular for use in an internal combustion engine.

The urea-water solution sensor measures the proportion of urea in the solution with water. This takes place, for example, by measuring the density with the aid of ultrasound or infrared measurement. Tiny bubbles in the measuring path of the sensor falsify the measuring result. The advantage of the present invention is the prevention or reduction of the entry of tiny bubbles (which have formed in the pump or in the lines, for example) into the urea-water solution tank, whereby suitable measuring conditions for the urea-water solution sensor are achieved.

It is provided in one advantageous refinement that the filter is a precoat filter or a cartridge filter, or a spatial filter, or a multi-layer bed filter, or a magnetic filter.

Another advantageous refinement provides that the filter includes flexible filter media or rigid filter media or packed beds.

One advantageous refinement provides that the filter material is a strainer or a paper filter or a glass fiber mat, or a ceramic, or a sintered metal, or a needle felt.

It is provided in another advantageous refinement that the pore size of the filter is smaller than 70 micrometers.

It is provided in another advantageous refinement that the filter is a two-dimensional filter or a three-dimensional filter or a multilayer filter or a surface filter or a depth filter.

One advantageous refinement provides that the urea-water solution tank is subjected to a vacuum and/or is provided with venting additives.

It is provided in another advantageous refinement that the urea-water solution tank includes an ultrasound generator and/or a heater, the ultrasound generator being situated in the quality sensor.

BRIEF DESCRIPTION OF THE DRAWINGS

Exemplary specific embodiments of the present invention are described in the figures and explained in greater detail in the following description.

DETAILED DESCRIPTION

Figure 1:
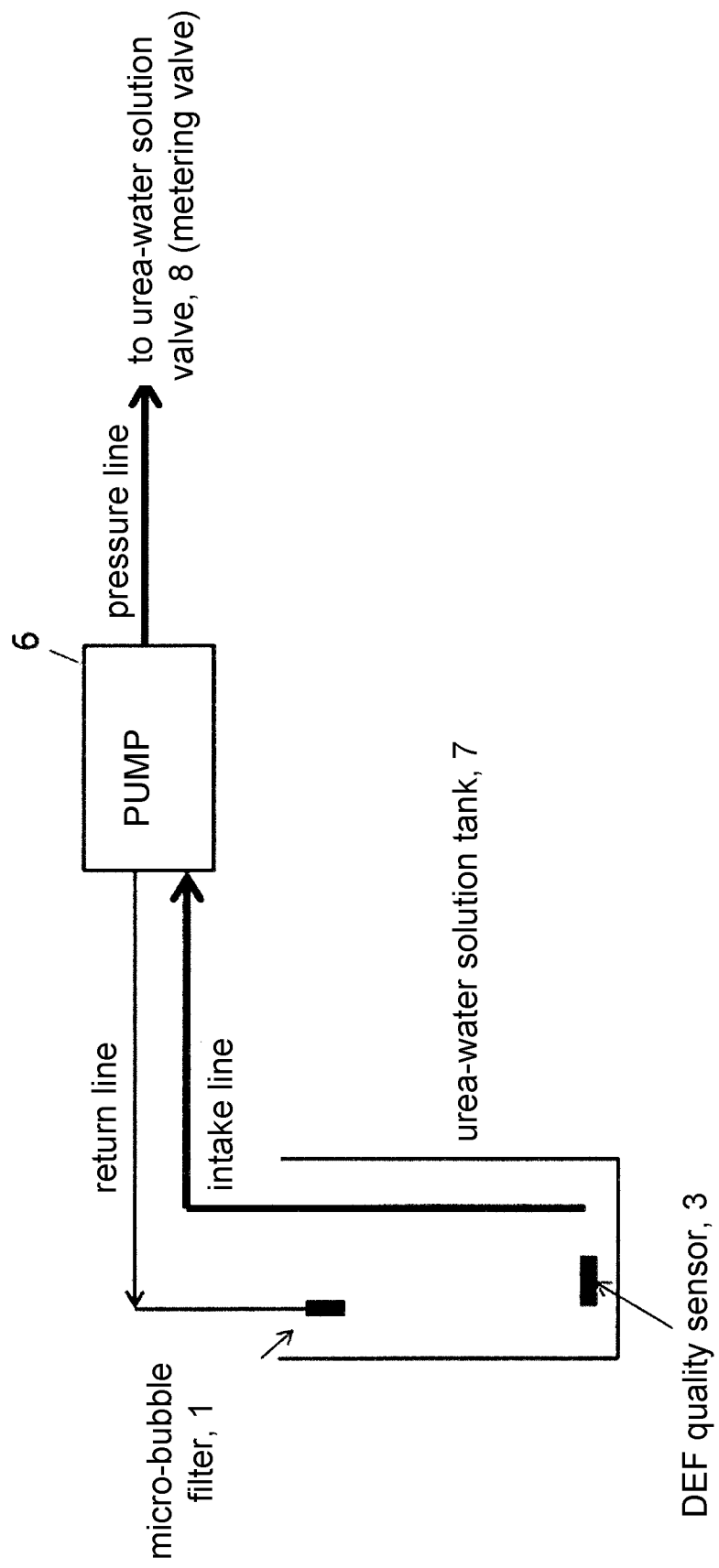
FIG. 1 shows a schematic representation of the urea-water solution tank up to the injector

FIG. 1 shows a schematic representation of urea-water solution tank 7 in which the urea water solution is contained and which includes a quality sensor 3. In urea-water solution tank 7, an intake line is situated at the one end of which a filter is situated and at the other end of which urea-water solution pump 6 is situated. At pump 6, a return line is also situated at the side of which opposite to the pump a filter 1 is situated which retains air bubbles. A pressure line runs from pump 6 to urea-water solution metering valve 8.

Figure 2:
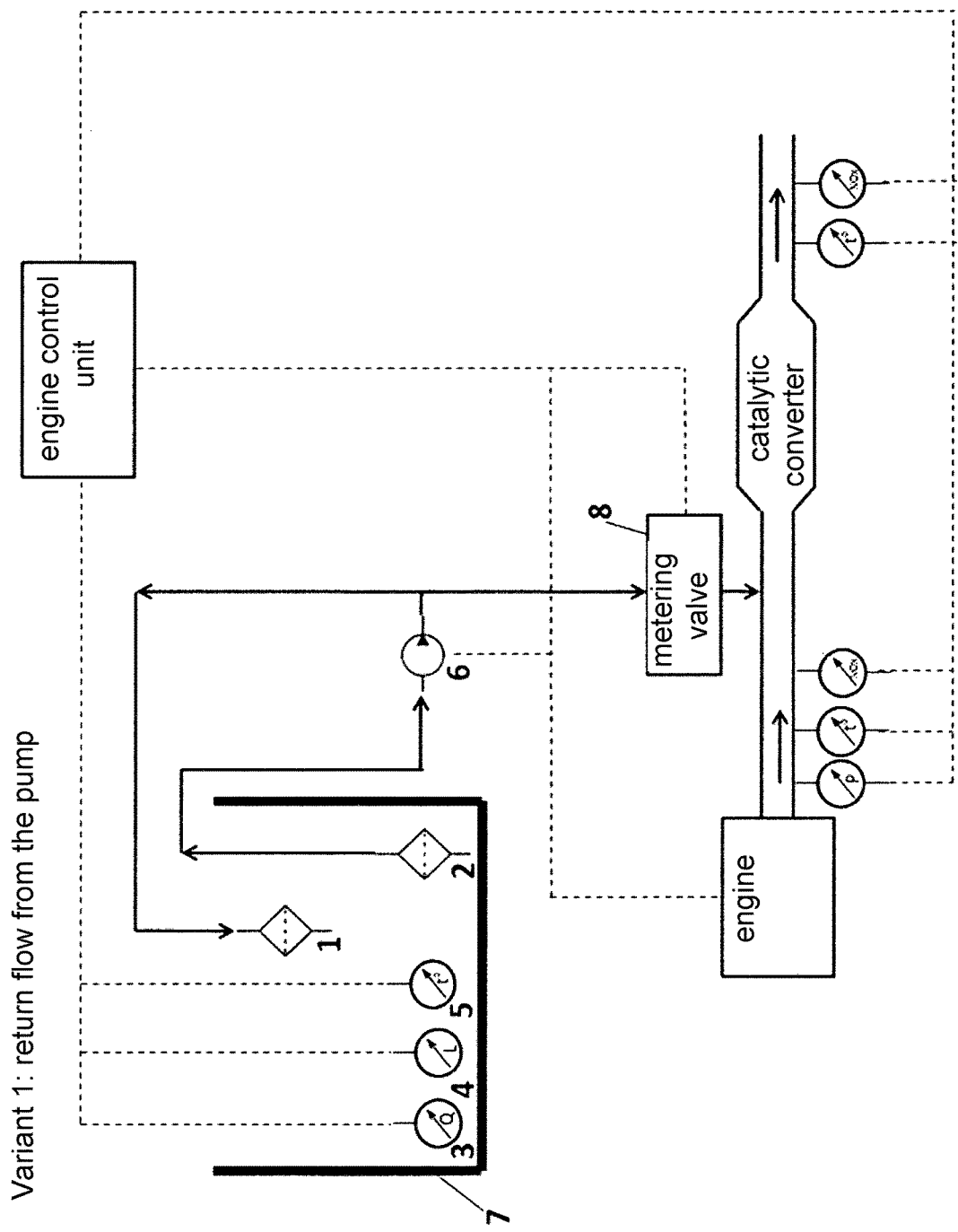
FIG. 2 shows a schematic representation of the internal combustion engine including the urea-water solution tank and metering valve]

In FIG. 2, a schematic representation of the internal combustion engine including urea-water solution tank 7, engine control unit (ECU), urea-water solution pump 6, and metering valve 8 which meters into the exhaust system is illustrated. Urea-water solution tank 7 includes a filter 1 at the return flow for bubble deposition, a filter 2 at the intake line, a quality sensor 3, a fill level sensor 4, and a temperature sensor 5 which are all connected to engine control unit (ECU) of internal combustion engine (ICE). In urea-water solution tank 7, an intake line is situated at the one end of which a filter 2 is situated and at the other end of which urea-water solution pump 6 is situated. At pump 6, a return line is also situated at the side of which opposite to pump 6 a filter 1 is situated which retains air bubbles. A pressure line runs from pump 6 controlled by engine control unit (ECU) to urea-water solution metering valve 8 which meters urea-water solution into the exhaust system and is also controlled by engine control unit (ECU) of internal combustion engine (ICE). In the exhaust system of internal combustion engine (ICE), between internal combustion engine (ICE) and the catalytic converter, a pressure sensor, a temperature sensor and an NOx sensor are situated, all of which are connected to engine control unit (ECU) of internal combustion engine (ICE). In the exhaust system of internal combustion engine (ICE) downstream from the catalytic converter, a temperature sensor and an NOx sensor are situated, all of which are connected to engine control unit (ECU) of internal combustion engine (ICE).

Figure 3:
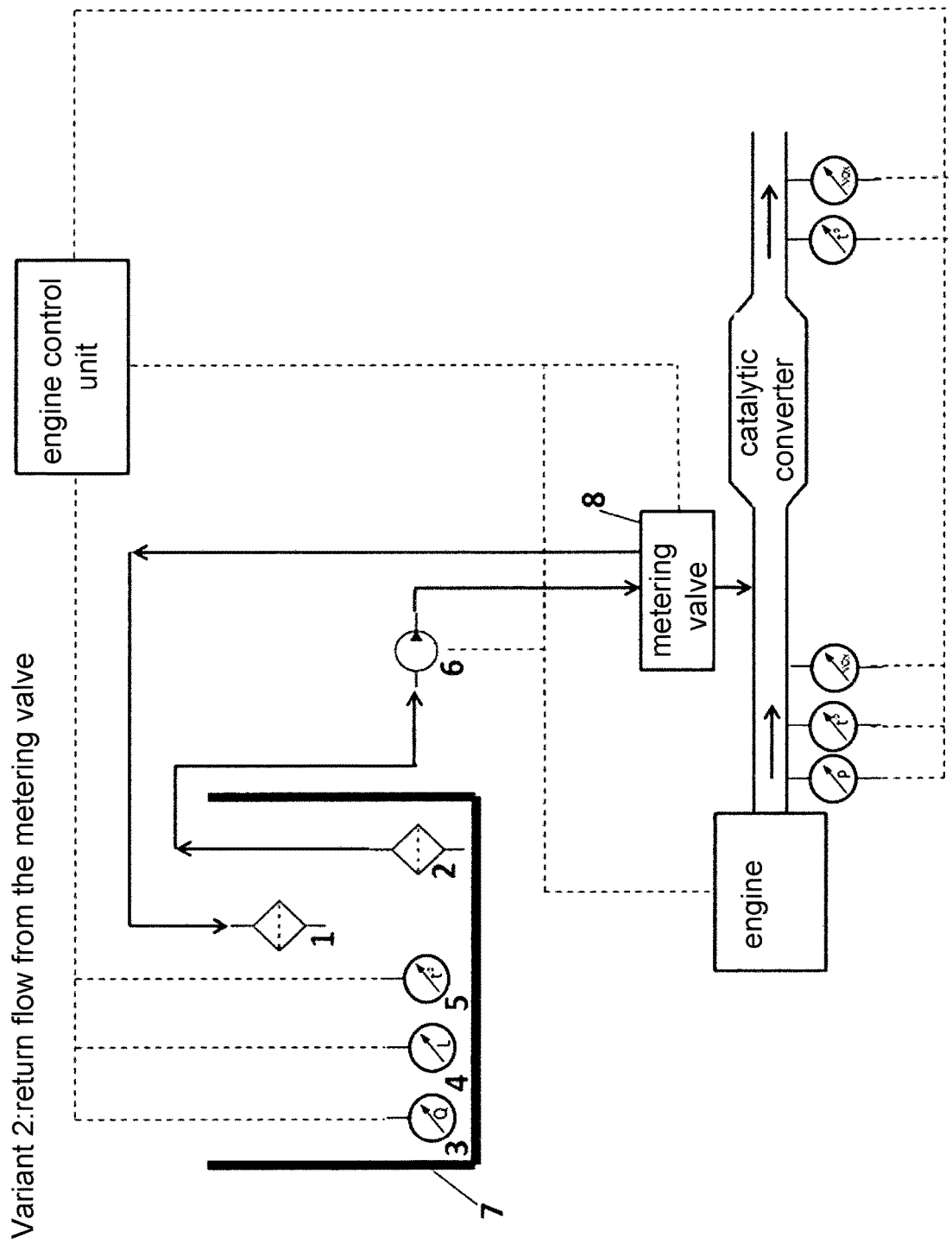
FIG. 3 shows a variant of the representation in FIG. 2 including a return flow from the metering valve.

FIG. 3 shows a schematic representation of the internal combustion engine including urea-water solution tank 7, engine control unit (ECU), urea-water solution pump 6, and metering valve 8 which meters into the exhaust system. Urea-water solution tank 7 includes a filter 1 at the return flow for bubble deposition, a filter 2 at the intake line, a quality sensor 3, a fill level sensor 4, and a temperature sensor 5 which are all connected to engine control unit (ECU) of internal combustion engine (ICE). In urea-water solution tank 7, an intake line is situated at the one end of which a filter 2 is situated and at the other end of which urea-water solution pump 6 is situated. At urea-water solution metering valve 8, a return line is also situated at the side of which opposite to pump 6 a filter 1 is situated which retains air bubbles. A pressure line runs from pump 6 controlled by engine control unit (ECU) to urea-water solution metering valve 8 which meters urea-water solution into the exhaust system and is also controlled by engine control unit (ECU) of internal combustion engine (ICE). In the exhaust system of internal combustion engine (ICE), between internal combustion engine (ICE) and the catalytic converter, a pressure sensor, a temperature sensor and an NOx sensor are situated, all of which are connected to engine control unit (ECU) of internal combustion engine (ICE). In the exhaust system of internal combustion engine (ICE) downstream from the catalytic converter, a temperature sensor and an NOx sensor are situated, all of which are connected to engine control unit (ECU) of internal combustion engine (ICE).

LIST OF REFERENCE NUMERALS

1 filter at the return flow for bubble deposition
2 filter at the intake line
3 quality sensor
4 fill level sensor
5 temperature sensor
6 urea-water solution pump
7 urea-water solution tank
8 urea-water solution metering valve
ECU engine control unit
ICE internal combustion engine

What is claimed is:

1. An internal combustion engine including a urea-water solution injection in an exhaust system, the internal combustion engine comprising:
    a urea-water solution tank;
    a pump;
    an intake line leading to the pump;
    a urea-water solution metering valve connected to the pump via a pressure line;
    a return line leading from the pump to the urea-water solution tank;
    a filter configured for retaining air bubbles generated by the pump situated at an end of the return line opposite to the pump to prevent or reduce an amount of the air bubbles from entering into the urea-water solution tank; and
    a urea-water solution sensor situated in the urea-water solution tank configured for measuring a proportion of urea in a solution with water in the urea-water solution tank.

2. The internal combustion engine as recited in claim 1, wherein the filter is a precoat filter or a cartridge filter, or a spatial filter, or a multi-layer bed filter, or a magnetic filter.

3. The internal combustion engine as recited in claim 1 wherein the filter includes flexible filter media, rigid filter media or packed beds.

4. The internal combustion engine as recited in claim 1 wherein a filter material of the filter is a strainer, a paper filter, a glass fiber mat, a ceramic, a sintered metal or a needle felt.

5. The internal combustion engine as recited in claim 1 wherein a pore size of the filter is smaller than 70 micrometers.

6. The internal combustion engine as recited in claim 1 wherein the filter is a two-dimensional filter, a three-dimensional filter, a multilayer filter, a surface filter or a depth filter.

7. The internal combustion engine as recited in claim 1 wherein the urea-water solution tank is subjected to a vacuum and/or is provided with venting additives.

8. The internal combustion engine as recited in claim 1 wherein the urea-water solution tank includes an ultrasound generator and/or a heater.

9. The internal combustion engine as recited in claim 1 wherein the pump is positioned outside of the urea-water solution tank such that the intake line extends out of the urea-water solution tank to the pump and the return line extends from the pump into the urea-water solution tank.

10. The internal combustion engine as recited in claim 1 further comprising a fill level sensor inside the urea-water solution tank.

11. The internal combustion engine as recited in claim 1 further comprising a temperature sensor inside the urea-water solution tank.

12. The internal combustion engine as recited in claim 1 wherein the pressure line extends from the pump to the urea-water solution metering valve, the urea-water solution arranged for metering valve metering the urea-water solution into the exhaust system upstream from a catalytic converter.

13. The internal combustion engine as recited in claim 1 wherein the urea-water solution sensor measures a density of the urea-water solution.

14. The internal combustion engine as recited in claim 13 wherein the urea-water solution sensor measures the density of the urea-water solution via ultrasound or infrared measurement.

* * * * *